United States Patent [19]

Niemeyer, III

[11] Patent Number: 4,860,032

[45] Date of Patent: Aug. 22, 1989

[54] AUTOMATIC PEN CAPPING MECHANISM

[75] Inventor: Robert H. Niemeyer, III, Beaverton, Oreg.

[73] Assignee: AM International Corporation, Chicago, Ill.

[21] Appl. No.: 210,992

[22] Filed: Jun. 24, 1988

Related U.S. Application Data

[63] Continuation-in-part of Ser. No. 75,533, Jul. 20, 1987, Pat. No. 4,763,140.

[51] Int. Cl.[4] .......................... G01D 9/30; G01D 9/00; G06K 15/00
[52] U.S. Cl. ................................ 346/139 R; 346/141; 346/49
[58] Field of Search .................... 346/139 R, 141, 46, 346/140 R, 29, 49; 364/520

[56] References Cited

U.S. PATENT DOCUMENTS 4,173,020  10/1979  Anderka ............................... 346/141
4,754,288   6/1988  Lawrence ......................... 346/139 R Primary Examiner—E. A. Goldberg
Assistant Examiner—Mark Reinhart
Attorney, Agent, or Firm—Roy A. Ekstrand; Nicholas A. Camasto

[57] ABSTRACT

A rotary action graphic recording system includes a pen carriage supporting a plurality of recording pen shuttles in a linear array together with means for moving the pen carriage in a carriage path. Each pen shuttle supports a recording pen having a downwardly extending tip. Rotary actuation means are supported by and operative upon the pen carriage to engage selected ones of the recording pen shuttles for movement of the pen tips into contact with the recording media. The rotary actuating means are operated by an elongated actuator beam supported in parallel with the carriage path and coupled to the rotary actuating means. Brake means within the rotary actuator are provided which are operative to engage the actuator beam and permit alignment of the rotary actuator with a slected pen within the pen carriage array by movement of the pen carriage. A plurality of pivotably supported pen capping doors are coupled to the pen shuttles such that the pen capping doors cover the pen tips when the pen shuttles are raised and expose them when the pen shuttles are lowered.

12 Claims, 4 Drawing Sheets

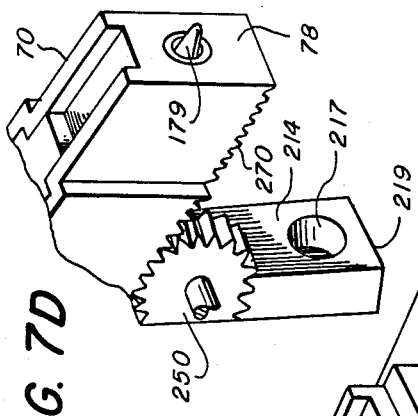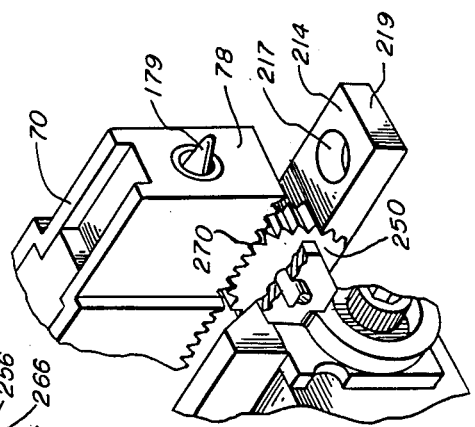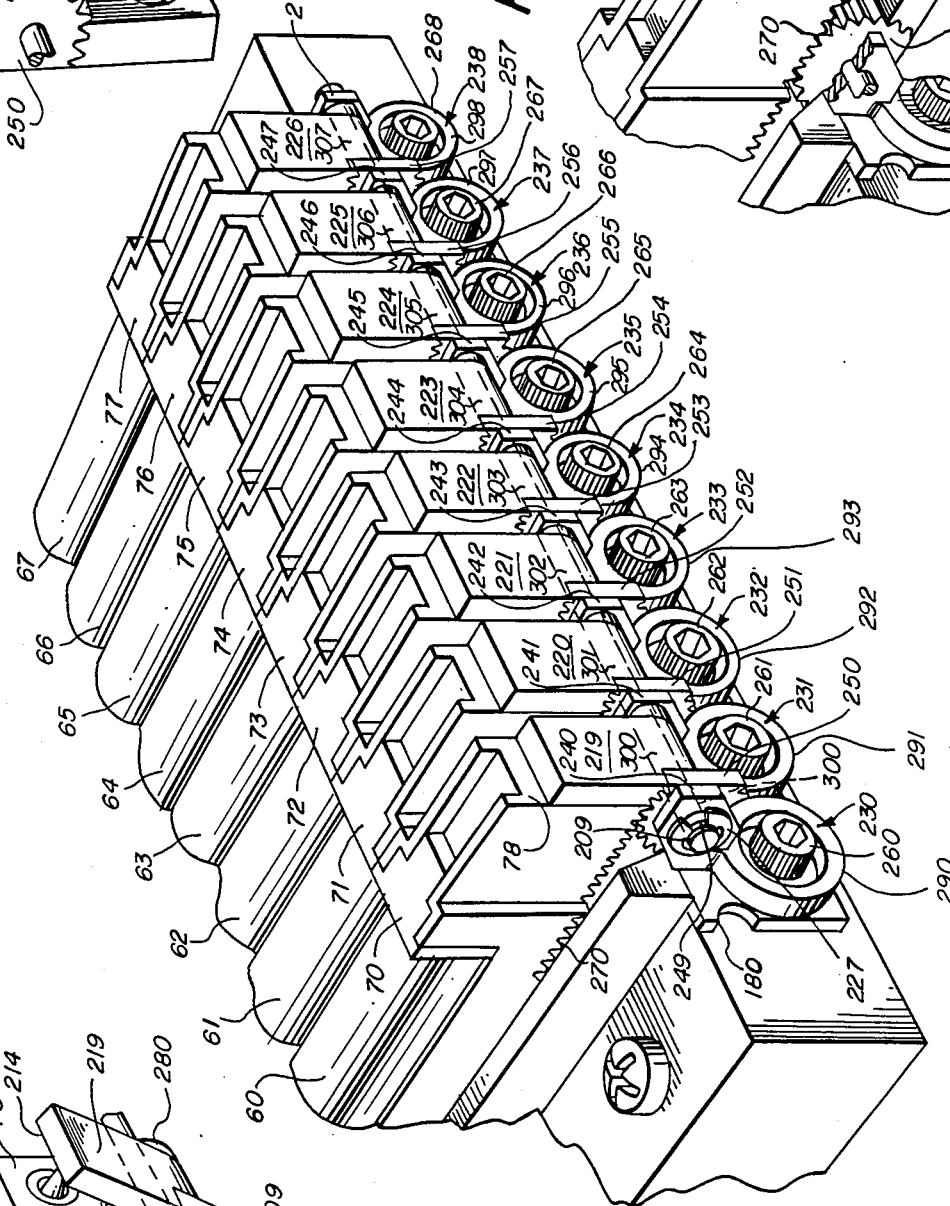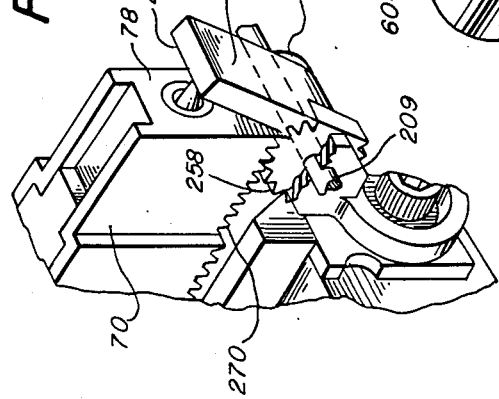

AUTOMATIC PEN CAPPING MECHANISM

CROSS REFERENCE TO RELATED PATENT APPLICATIONS

This application is a continuation in part of a copending application entitled ROTARY ACTION GRAPHIC RECORDING SYSTEM filed July 20, 1987 in the name of Robert H. Niemeyer III having an application Ser. No. 07/075,533 which is assigned to the assignee of this application.

FIELD OF THE INVENTION

This invention relates generally to graphic recording systems and particularly to pen capping mechanisms used therein.

BACKGROUND OF THE INVENTION

A substantial number of graphic recording systems have been developed to provide automated or computer controlled graphic recording upon a media. While the individual structures of such graphic recorders vary substantially, generally all include a media transport system in which the media is moved in a first direction and a moveable pen carriage supported and controlled to provide motion of the pen carriage in a second direction relative to media motion. In most instances, the directions of media movement and pen carriage movement are orthogonal. With the development of computer drive systems having increased capability, their arose a need to provide graphic recording systems employing a plurality of recording pens. In most instances, the plurality of pens facilitated multiple color recording.

The manner in which the plurality of recording pens are supported upon the pen carriage varies substantially between graphic recorder manufacturers. However, in most systems the pen carriage supports an array of recording pens which are selectively moveable between positions removed from the recording media and positions in which the selected pen writes or records upon the media. Carriage drive means are generally operative to move the pen carriage repeatedly back and forth along a supported pen carriage track. Since all pens are carried by the pen carriage, the pen carriage motion subjects the pens motion of the surrounding air. While it is the pens which are moved through the surrounding air, the air flow about the pens produces the same relative effect as would result from subjecting stationary pens to a directed flow of moving air. As a result, the raised pens are consistently exposed to a substantial air flow. The majority of recording pens used in graphic recorders include constructions which are adversely effected by exposure of the writing tips to air flow. In the most typically used recording pen, a porous fiber tip or similar structure is used together with a supply of relatively low viscosity ink. The problem is further exacerbate by the characteristic of such porous tip recording pens in accordance with which the pen tips are more subject to excessive drying when the pens are not recording. In essence, the flow of ink during the recording process from the pen tip to the media tends to overcome the drying process.

Thus the pens supported upon the pen carriage are subject to the drying effect as the pen carriage moves through the plotting process. This drying effect, of course, is undesired in that it shortens the useful life of the pens. However, a more serious consequence of the drying effect upon pens during nonuse, concerns the unreliability of the pens writing characteristics. In accordance with the general function of the multi-pen graphic recording systems, the computer control system driving pen carriage motion operates on the assumption that the recording pen placed in contact with the media will write immediately without any lag or wasted motion. In the event the pen lowered to the media has been dried, it will of course not perform in accordance with anticipated reliability resulting in skipping and poor line quality.

The need to protect recording pens from being dried out by the pen carriage motion during times of nonuse has prompted practicioners in the art to devise several systems to shield or protect the pens while they are withdrawn from media contact. In some systems, for example, the recording pens are positioned within closed receptacles supported upon the pen carriage when not in use. In other systems, elaborate mechanical devices are individually operative to apply individual pen caps to the recording pens during periods of nonuse.

While the prior art systems have provided some improvement in pen life and a reduction of recording pen dry out, they tend to be mechanically cumbersome and costly to produce. In addition, some systems add prohibitive weight to the pen carriage. As is known, the latter effect is particularly undesirable because additional pen carriage weight can degrade overall recording systems and performance.

There remains therefore, a need in the art for a lightweight, low cost, effective and mechanically simple automatic pen capping means for graphic recorders.

SUMMARY OF THE INVENTION

Accordingly it is a general object of the present invention to provide an improved multi-pen graphic recording system. It is a more particular object of the present invention to provide an improved multi-pen graphic recording system in which the degrading effect of pen drying due to carriage motion is avoided. It is a still more particular object of the present invention to provide effective pen capping for a multi-pen graphic recording system which requires no additional powered elements and which is inexpensive to produce and which caps each pen individually.

In accordance with the present invention, there is provided for use in a graphic recorder having a moveable pen carriage, supporting thereon a plurality of pen shuttles and a corresponding plurality of recording pens each having an extending pen tip, and means moving a selected one of said plurality of pens into a write position by moving its associated pen shuttle; automatic pen capping means comprising a plurality of gear racks each supported upon a respective pen shuttle; a plurality of pen capping doors each configured to enclose a respective extending pen tip; means pivotally supporting the plurality of pen capping doors such that each pen capping door is pivoted between a position enclosing its associated pen tip and a position exposing its associated pen tip; and a plurality of gear means each coupled to a pen capping door and engaging a gear rack. Each of the gear means and its associated gear rack cooperate during pen shuttle motion respective to pivot the pen capping door to either enclose or expose the pen tip as a function of pen shuttle position.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

FIGS. 7A, 7B, 7C and 7D set forth sequential perspective views of the present invention automatic pen capping mechanism.

DESCRIPTION OF THE PREFERRED EMBODIMENT

Figure 1:
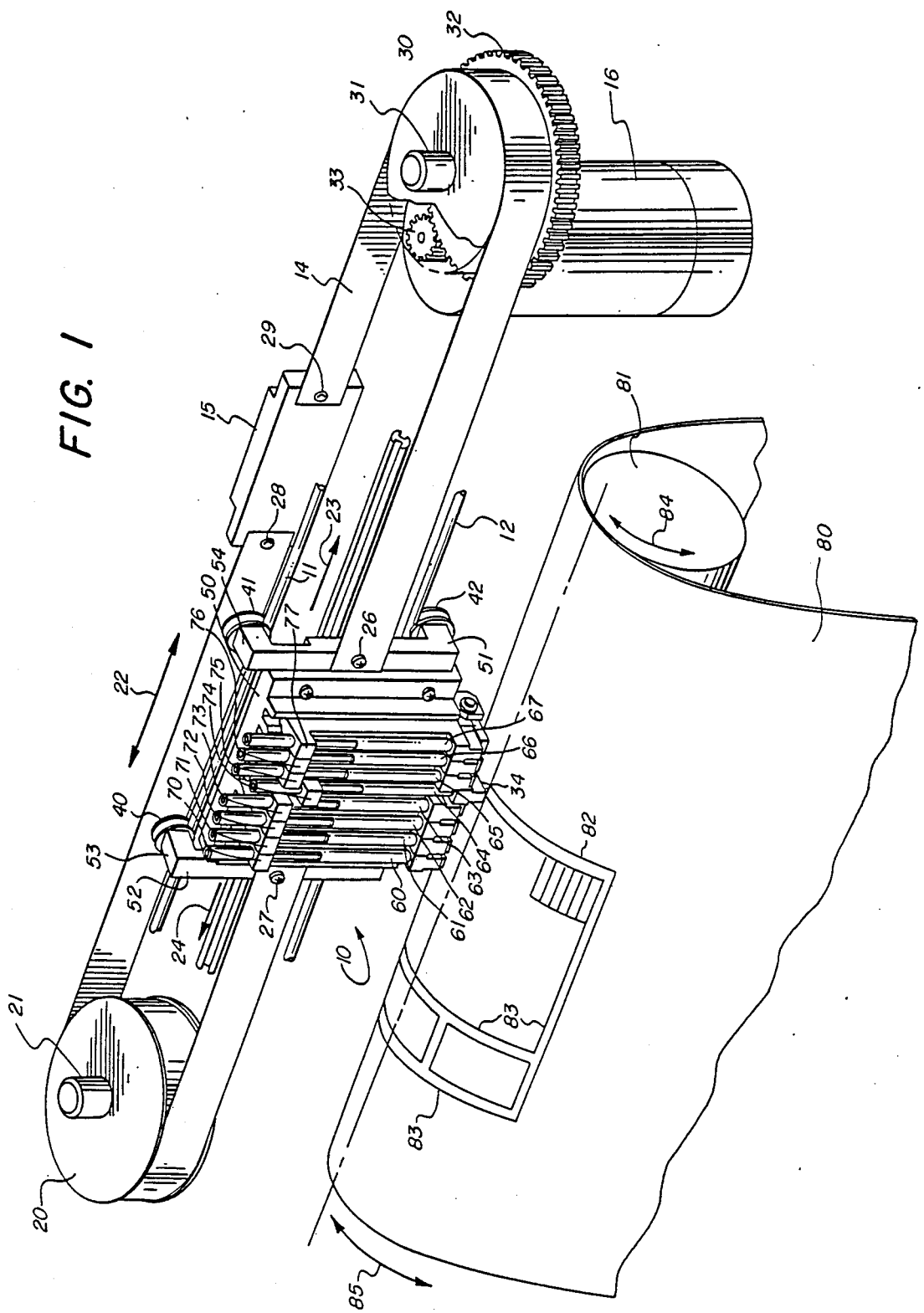
FIG. 1 is a perspective view of a graphic recording system utilizing the present invention automatic pen capping mechanism.

FIG. 1 sets forth a perspective view of a rotary actuated graphic recording system having a plurality of automatic pen capping mechanisms constructed in accordance with the present invention. A moveable pen carriage, generally referenced by numeral 10, is secured to and controlled by a closed flexible carriage band 14. Carriage band 14 comprises a generally flat ribbon-like band of stainless steel. An upper track 11 and lower track 12 are supported parallel to the motion path of the forward portion of carriage band 14 by means not shown. It will be apparent, however, that the support of tracks 11 and 12 may include any of the presently available track support structures used in graphic recorders provided tracks 11 and 12 are supported in a substantially rigid manner such that the tracks support the weight of and resist vibrations imparted to pen carriage 10.

Pen carriage 10 includes a pen shuttle guide 50 formed of a lightweight, rigid, plastic material. A pair of generally U-shaped wheel support members 51 and 52, also formed of a lightweight, rigid, plastic material, are secured to pen shuttle guide 50 by means set forth below in greater detail. Wheel support 51 terminates at one end in a rearwardly extending axle support 54 and at the other end in a similar axle support 55. Wheel support 52 is substantially the same as wheel support 51 and terminates at one end in a rearwardly extending axle support 53 and a rearwardly extending axle support 56 at the other end (the latter seen in FIG. 3). A quartet of grooved wheels 40, 41, 42, and 43 (better seen in FIG. 3) are rotatably secured to axle supports 53, 54, 55, and 56 respectively. Wheels 40 through 43 are configured to receive and provide a track engagement with upper track 11 and lower track 12. The resulting cooperation of wheels 40 through 43 and tracks 11 and 12 retains pen carriage 10 in a rolling engagement with upper track 11 and lower track 12 such that pen carriage 10 is freely moveable in the directions indicated by arrows 23 and 24.

Pen carriage 10, by means set forth in greater detail in the above-referenced copending application, supports a plurality of generally elongated pen shuttles 70 through 77 which are moveably secured to pen shuttle guide 50 in a linear array generally perpendicular to the direction of travel of pen carriage 10. Pen shuttles 70 through 77 each support a corresponding one of a plurality of pens 60 through 67 respectively such that motion of a selected one of pen shuttles 70 through 77 results in a corresponding motion of the associated pen. By way of example, FIG. 1 depicts pen shuttles 70 through 73 and 75 through 77 in their raised position while pen shuttle 74 is shown in its downwardly extending or lowered position. Correspondingly, pens 60 through 63 and 65 through 67 are supported in their raised position by a spring better shown in FIG. 3 while pen 64 is supported in its downwardly extending position similar to the pen position shown in FIG. 5.

A media drive roller 81, constructed in accordance with the presently known graphic recording system media drive structures, is supported by conventional means (not shown) such that its major axis is generally parallel to the travel path of pen carriage 10. A flexible media 80 comprising a long sheet representative of a typical media material is supported by media roller 81 such that rotational motion of media roller 81 in the path indicated by arrows 84 results in a corresponding linear motion of media 80.

A pair of pulleys 20 and 30 are rotatably supported by a pair of pulley supports 21 and 31 respectively. By means not shown but which may include any conventional pulley support mechanism, pulleys 20 and 30 are supported at opposite ends of the travel path of carriage band 14. The respective ends of carriage band 14 are joined by a pair of fasteners 8 and 9 to an elongated counterweight 15. Except for the gap at counterweight 15, carriage band 14 comprises a continuous ribbon of material extending from fastener 28 around pulley 20 through pen carriage 10 and around drive pulley 30 to fastener 29. As a result, carriage band 14 extends through pen carriage 10 by means set forth below in greater detail. Pulley 20 comprises a free moving idler pulley while drive pulley 30 supports a ring gear 32. A carriage motor 16 which may comprise any of the number of presently available bidirectional electric motors supports a drive gear 33 which in accordance with generally accepted principles of graphic recorder construction is operatively coupled to the armature of carriage motor 16 (not shown) such that energizing carriage motor 16 results in rotating gear 33. Drive pulley 30 is supported with respect to gear 33 such that gear 33 engages gear 32 causing drive pulley 30 to rotate in response to energizing of carriage motor 16. By means not shown, but in accordance with generally accepted fabrication techniques, carriage band 14 is maintained in tension to provide effective coupling of motion between drive pulley 30 and carriage band 14. As a result, rotational drive pulley 30 produces corresponding motion of carriage band 14 in the path indicated by arrow 22 which in turn produces a corresponding motion of pen carriage 10 in the path indicated by arrows 23 and 24.

An elongated actuator beam 13 is supported in a substantially parallel relationship with the travel path of pen carriage 10 by means not shown. As is set forth in the above-referenced copending application, actuator beam 13 is operatively coupleable to selected ones of pen shuttles 70 through 77 to produce vertical motion of a selected one of pens 60 through 67.

In accordance with the invention, pen carriage 10 supports a plurality of pen capping doors 219 through 226 which are each supported at the lower ends of pen shuttles 70 through 77 respectively. The structures of pen capping doors 219 through 226 as well as the manner in which they are supported by pen shuttle guide 50 is set forth below in greater detail. Suffice it to note in FIG. 1, however, that pen capping doors 219 through 222 and 224 through 226 are closed against raised pen shuttles 70 through 73 and 75 through 77 respectively. Pen capping door 223 however is removed from closure upon lowered pen shuttle 74 exposing pen tip 34. The opening of pen capping door 223 due to the lowered position of pen shuttle 74 permits pen 64 to write while the closure of pen capping doors 219 through 222 and 224 through 226 protects the tips (not shown) of pens 60 through 63 and 65 through 67.

In operation, electronic control means constructed in accordance with generally accepted graphic recording system techniques are operative to cause motor 16 to drive carriage band 14 and thereby pen carriage 10 back and forth along the travel path indicated by arrows 23 and 24 to produce motion of pen carriage 10 in either of two directions along the carriage travel path. Concurrently, the electronic control means are operatively coupled to media roller 81 through conventional fabrication techniques to rotate media roller 81 in either of the directions indicated by arrow 84 and cause a corresponding motion of media 80 in either of the directions indicated by arrow 85. By means set forth in greater detail in the above-referenced copending application, a selected pen shuttle, such as pen shuttle 74, is moved by rotation of actuator beam 13 in a downward direction which in accordance with an important aspect of the present invention, opens the associated pen capping door (door 223) exposing pen tip 34 of pen 64 allowing it to contact the surface of media 80. Thereafter, under control of the electronic control means, combinations of pen carriage motion in directions indicated by arrows 23 and 24 together with coordinated motions of media 80 in the directions indicated by arrow 85 result in recording a plurality of line markings 83 upon media 80.

While pens 60 through 67 may comprise recording pens having a variety of pen characteristics, most commonly pens 60 through 67 will be selected to provide different color recording pens. Accordingly, as is set forth in greater detail in the above-referenced copending application, operation of actuator beam 13 and the rotary pen actuation described therein cooperate with carefully controlled motion of pen carriage 10 to permit the selective use of the desired one of pens 60 through 67.

Figure 2:
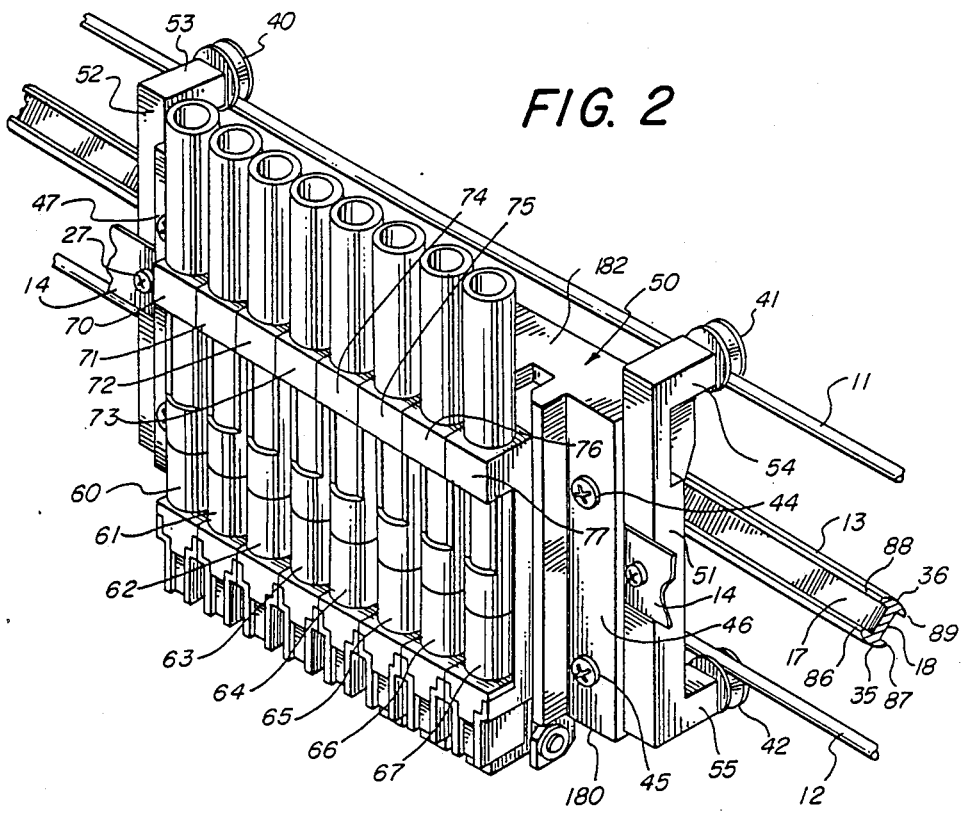
FIG. 2 is a front perspective view of a pen carriage utilizing the automatic pen capping mechanism of the present invention.

FIG. 2 sets forth an enlarged and more detailed front perspective view of pen carriage 10. As mentioned above, pen carriage 10 is carried upon upper track 11 and lower track 12 by a quartet of grooved wheels 40 through 43 (the latter shown in FIG. 3). Pen shuttle guide 50 includes a rigid top 182 and rigid base 180 forming the upper and lower sides of the generally rectangular configuration of pen shuttle guide 50. Top 182 and base 180 of pen shuttle guide 50 are joined by a generally planar flange portion 46 on one side and an identical planar flange portion 47 on the other. Top 182, base 180 and flange portions 46 and 47 are combined in a single molded unit.

Wheel supports 51 and 52 are identical in construction and are described in the above-referenced copending application. Suffice it to note here that wheel support 52 defines a pair of inwardly extending tabs 57 and 58 which in turn define threaded apertures 69 and 68. Tabs 57 and 58 extend behind flange portion 46 of pen shuttle guide 50. A pair of threaded fasteners 44 and 45 extend through underlying apertures in flange portion 46 (not shown) and are threadably received within apertures 69 and 68 respectively to secure wheel support 51 to flange portion 46 of pen shuttle guide 50. A similar attachment occurs between wheel support 52 and flange portion 47 on the other side of pen shuttle guide 50. As is also set forth above, carriage band 14 is formed of a thin ribbon of stainless steel and extends uninterrupted through the entire structure of pen carriage 10. Threaded fasteners 26 and 27 which pass through apertures in carriage band 14 (not shown) and are threadably received within wheel supports 51 and 52 respectively in a conventional threaded attachment.

Actuator beam 13 defines a pair of longitudinally extending parallel channels 17 and 18 and an opposed pair of convex surfaces 35 and 36. In addition, actuator beam 13 defines a pair of longitudinally extending flat surfaces 88 and 89 at each side of convex surface 36 and a pair of similar flat surfaces 86 and 87 at each side of convex surface 35. The functional importance of channels 17 and 18, convex surfaces 35 and 36 and flat surfaces 87 through 89 are set forth below in greater detail. However, suffice it to note here that actuator beam 13 comprises an elongated member having a substantially constant cross-section formed in an approximate I-beam shape which is engaged by a rotary drive 90.

In accordance with the invention, a plurality of pen capping doors 219 through 226 are supported by a corresponding plurality of support flanges (shown in FIG. 7A). As is also described in connection with FIG. 7A, a cylindrical pin 209 pivotally supports pen capping doors 219 through 226.

Figure 3:
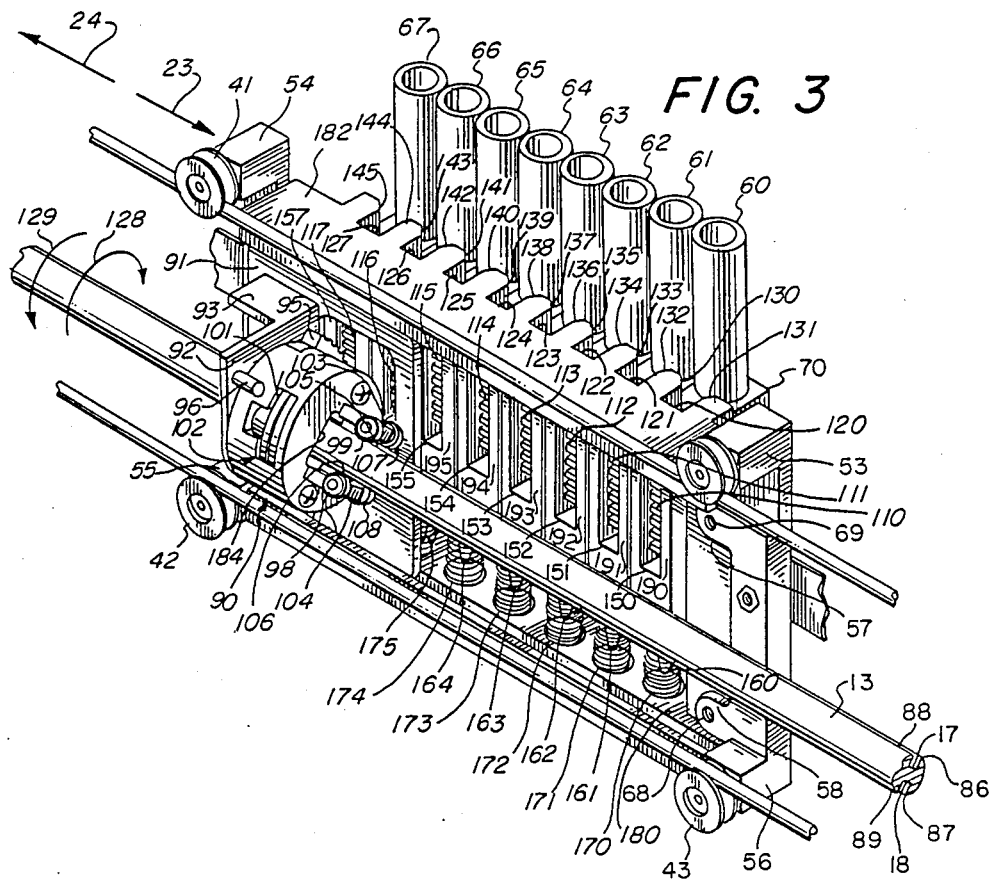
FIG. 3 is a rear perspective view of the pen carriage having the present invention pen capping mechanism.

FIG. 3 sets forth a rear perspective view of pen carriage 10, which as set forth above, is supported upon upper track 11 and lower track 12 by grooved wheels 40 through 43 and defines a pen shuttle guide 50 which is secured to wheel supports 51 and 52 in a precise alignment with upper track 11 and lower track 12. Top 182 of pen shuttle guide 50 defines a plurality of parallel vertically extending pen channels 120 through 127. The structure of pen shuttle guide 50 is set forth in the above-referenced copending application. However, suffice it to note here that pen shuttle channels 120 through 127 define pairs of inwardly extending angled surfaces such as 130 and 131 which extend the entire length of pen shuttle channel 120. By means set forth below in greater detail, pen shuttles 70 through 77 are received within pen shuttle channels 120 through 127 respectively and include bearing structures cooperating with the respective angled surfaces of pen shuttle channels 120 through 127 to provide a precise travel path for each of pen shuttles 70 through 77. A plurality of pen shuttle backs 190 through 197 are secured to pen shuttles 70 through 77 respectively by means of attachment set forth below n greater detail. The attachment between pen shuttle backs 190 through 197 and pen shuttles 70 through 77 respectively captivates pen shuttles 70 through 77 in sliding engagement with pen shuttle channels 120 through 127 respectively. Pen shuttles 70 through 77 are biased to their raised positions shown in FIGS. 2 and 3 by a plurality of coiled springs 170 through 177 (springs 176 and 177 not shown). As a result, pen shuttles 70 through 77 are slideably moveable within pen channels 120 through 127 respectively and are maintained in their top most positions within channels 120 through 127 by the biasing of springs 170 through 177 respectively. However, the spring constants of springs 170 through 177 are selected to permit the springs to be overcome and permit pen shuttles 70 through 77 to be moved downwardly to the extended position shown occupied by pen 74 in FIG. 1. This downward position is the extension of the recording pens which permits recording upon the media.

Pen shuttle backs 190 through 197 are of identical construction and define a plurality of elongated apertures 150 through 157 respectively which in turn receive a plurality of gear racks 110 through 117. Gear racks 110 through 117 comprise generally planar members having a plurality of longitudinally extending parallel gear teeth in a straight line arrangement.

As mentioned above, actuator beam 13 extends parallel to upper track 11 and lower track 12 and is spaced from tracks 11 and 12 by a predetermined distance which is constant over the entire travel track of pen carriage 10. Base 180 defines a downwardly extending channel 181 extending its entire length and top 182 defines a similar channel 183 extending upwardly across the entire length of pen shuttle guide 50. A generally planar drive carriage 91 is received within channels 181 and 183 and supported thereby in a vertical position substantially parallel to pen shuttle backs 190 through 197. Drive carriage 91 is captivated within channels 181 and 183 in a precise fit which maintains the vertical position of drive carriage 91 accurately while permitting drive carriage 91 to be readily moved back and forth across pen shuttle guide 50 for reasons set forth below in greater detail.

A generally planar support flange 92 is perpendicular to and joined to drive carriage 91. A gear stop 96 comprising a generally cylindrical extension is joined to support flange 92. While not visible in FIG. 3, support flange 92 also defines an aperture through which actuator beam 13 passes. The size of the aperture in support flange 92 is substantially greater than the dimensions of actuator beam 13 thereby permitting support flange 92 to move freely with respect to actuator beam 13. A generally planar support 93 is joined to drive carriage 91 and the upper edge of support flange 92 to strengthen the attachment of support flange 92 to drive carriage 91. Rotary drive 90 comprises a generally cylindrical housing 100 defining a substantially rectangular center aperture 184 (better seen in FIG. 4) and an irregularly shaped aperture 101. A pair of generally rectangular bearing supports 103 and 104 are joined to and supported by the front surface of drive housing 100 adjacent opposite sides of aperture 184. Bearing support 103 supports an inwardly facing bearing 105 and a pair of transversely facing bearings 99 and 107. Similarly, bearing support 104 supports an inwardly facing bearing 106 and a pair of transversely facing bearings 98 and 108. A curved gear 95 extends outwardly from drive housing 100 and defines a radius of curvature slightly greater than that of drive housing 100. A shaft brake mechanism 102 is supported within drive housing 100.

Drive housing 100 is rotatably supported upon support flange 92 and is rotatable in the counterclockwise direction to a maximum counterclockwise position in which gear 95 abuts gear stop 96. In the fully counterclockwise position, gear 95 assumes the position shown in FIG. 6. As drive housing 100 is rotated from its maximum counterclockwise position, gear 95 moves to a position in which it extends through aperture 94 in drive carriage 91 and into the one of apertures 150 through 157 which are aligned with gear 95. In the position shown in FIG. 3, gear 95 is in alignment with aperture 157 of pen shuttle back 197 and therefore extends through aperture 177 therein. With continued clockwise rotation of drive housing 100, gear 95 engages gear rack 117 of pen shuttle back 197. Thereafter, further clockwise rotation of drive housing 100 causes a downward force to be exerted upon gear rack 117 which in turn overcomes the spring biasing force of spring 177 (seen in FIG. 4) and begins to move pen shuttle 77 in the downward direction. Finally, the clockwise motion of drive housing 100 moves gear rack 117 and pen shuttle 77 in the downward direction until the point of the selected pen contacts the media.

As mentioned above, actuator beam 13 extends through aperture 184 in drive housing 100 and a second aperture (not seen) in flange support 92. As a result, actuator beam 13 extends completely through rotary drive 90 and rotary drive 90 is freely moveable with respect to actuator beam 13. It should be noted that bearing supports 103 and 104 are positioned generally parallel to actuator beam 13 and that bearing supports 103 and 104 are spaced from and oriented with respect to actuator beam 13 and aperture 184 such that inwardly facing bearings 105 and 106 are received within channels 17 and 18 respectively and transverse bearings 98, 99, 107 and 108 contact flat surfaces 86 through 89. As a result, a mechanical coupling between drive housing 100 and actuator beam 13 is created by the extension of bearings 105 and 106 into channels 17 and 18. In other words, rotation of actuator beam 13 in the direction indicated by arrow 128 causes the above-described clockwise rotation of drive housing 100 and rotation of actuator beam 13 in the direction indicated by arrow 129 causes the above-described counterclockwise rotation of drive housing 100.

As mentioned above, housing 100 supports an internal brake mechanism 102, which is operative in response to counterclockwise rotation of actuator beam 13. As gear 95 is rotated toward gear stop 96, brake mechanism 102 engages convex surfaces 35 and 36 to secure rotary drive 90 to actuator beam 13. In its preferred operation, brake 102 engages beam 13 while gear 95 is approximately fifteen degrees away from gear stop 96. The securing of brake 102 to convex surfaces 35 and 36 is released when actuator beam 13 is rotated in the clockwise direction from its maximum counterclockwise position permitting free motion of rotary drive 90 upon actuator beam 13.

With this understanding of the structure of pen carriage 10 and rotary drive 90, the pen changing operation may be described. As described above, pen carriage 10 is moveable upon tracks 11 and 12 in the directions indicated by arrows 23 and 24. All motion of pen carriage 10 is imparted by carriage band 14 in accordance with the above-described actions of carriage motor 16, drive pulley 30 and gears 32 and 33. Because drive carriage 91 is freely moveable with respect to pen carriage 10 within channels 181 and 183 of pen shuttle guide 50, rotation of actuator beam 13 to the counterclockwise position seen in FIG. 6 causes brake 102 to grasp convex surfaces 35 and 36 and maintains the position of rotary drive 90 upon actuator beam 13 notwithstanding motion of pen carriage 10. Accordingly, with actuator beam 13 in the counterclockwise position shown in FIG. 6 and rotary drive 90 secured to actuator beam 13, motion of pen carriage 10 produces a relative motion between rotary drive 90 and pen carriage 10. Because pens 60 through 67 are arranged in a linear array along the path of travel of pen carriage 10, selection of a desired one of pens 60 through 67 for recording use is accomplished by locking rotary drive 90 to actuator beam 13 by counterclockwise motion and thereafter moving pen carriage 10 until gear 95 of rotary drive 90 is aligned with the aperture in the pen carriage back corresponding to the desired pen.

By way of example, with the relative positions of pen carriage 10 and rotary drive 90 shown in FIG. 3 in which gear 95 is aligned with aperture 157 of pen shuttle back 197 corresponding to pen 67, the desired one of the remaining pens 60 through 66 is selected by rotating actuator beam 13 to lock rotary drive 90 to actuator beam 13. Next, pen carriage 10 is moved in the direction indicated by arrow 24 until gear 95 is brought into alignment with the aperture in the pen shuttle back corresponding to the desired pen. For example, in the event pen 63 is selected for next use, pen carriage 10 is moved in the direction of arrow 24 until gear 95 is aligned with aperture 153 in pen shuttle back 193. Thereafter, pen carriage 10 is momentarily stopped while actuator beam 13 is rotated in the clockwise direction indicated by arrow 128 which simultaneously releases brake 102 and moves gear 95 into aperture 153. Once brake 102 is released and gear 95 extends into aperture 153 of pen shuttle back 193, motion of pen carriage 10 in either of the directions indicated by arrows 23 or 24 may be resumed. At this point, gear 95 assumes the position shown in FIG. 4 corresponding to the "rest position" of the actuator system in which pen 63 has not yet been moved downwardly to facilitate contact with the media. Once pen carriage 10 has reached the position over the media at which it is desired to begin recording upon the media, actuator beam 13 is rotated in the clockwise direction indicated by arrow 128 to cause gear 95 to engage rack 113 and drive pen shuttle 73 and thereby pen 63 downward until contact with the media is established. With contact established with the media by pen 63, the motions of pen carriage 10 and the media set forth in descriptions accompanying FIG. 1 is undertaken to carry out the plotting operation.

Thus with the foregoing understanding of the plotting operation in which selected pens are lowered into contact with the media and the remaining pens rest in their raised position, the present invention automatic pen capping mechanism may be further described. It will be appreciated that pen carriage 10 is moved back and forth along tracks 11 and 12, and pens 60 through 67 are subjected to substantial air movement. But for the present invention action of pen capping doors 219 through 226, this air movement would quickly dry pens 60 through 67 and reduce their useful life. In accordance with the operation of the present invention automatic pen capping system set forth below, the pen tips of the pens are effectively sealed and protected from surrounding air movement while in the raised position.

Figure 4:
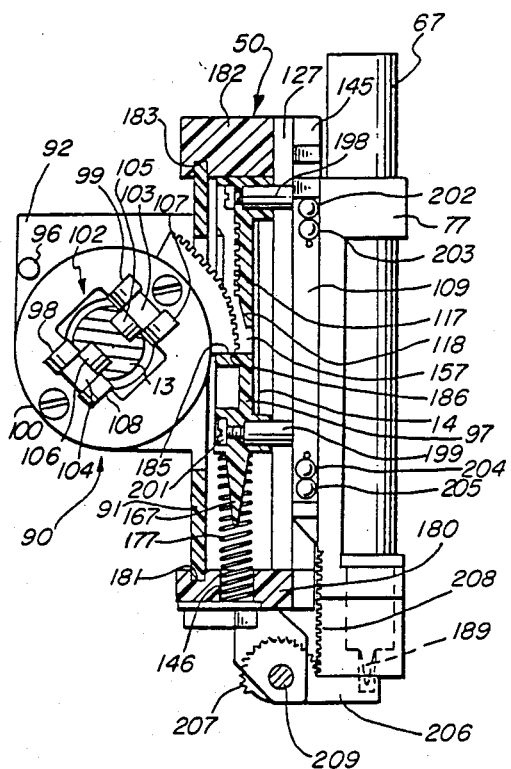
FIGS. 4, 5 and 6 show the sequential operation of the present invention automatic pen capping mechanism.
Figure 5:
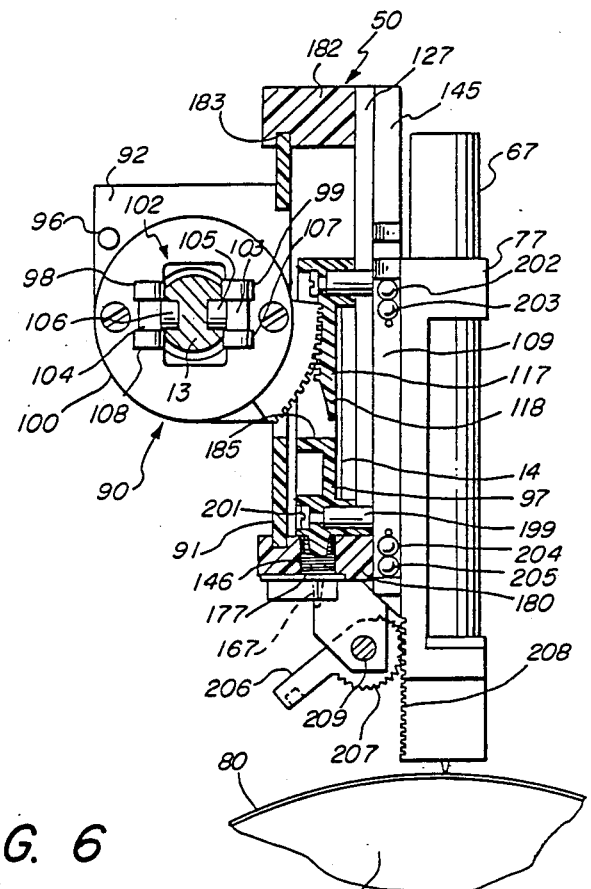
Figure 6:
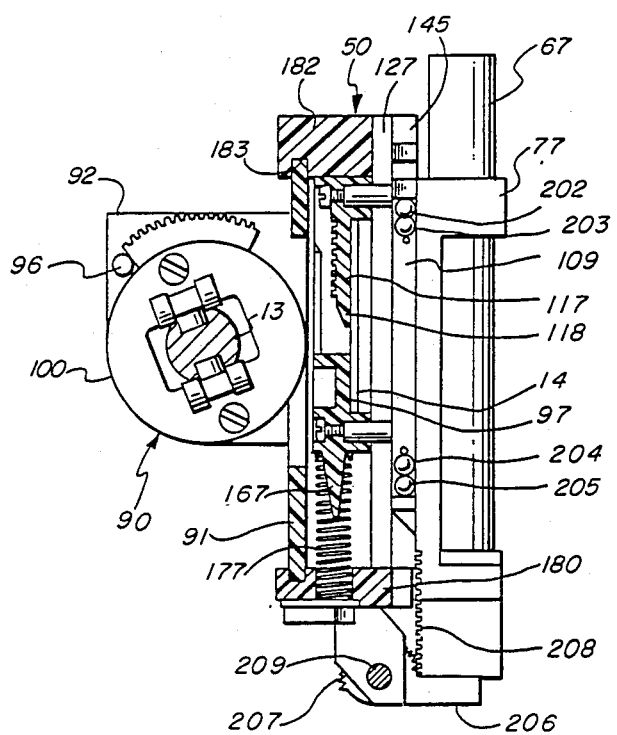

FIGS. 4, 5 and 6 set forth partially sectioned sequential views of pen carriage 10 showing the cooperation of pen shuttle 77 and pen capping door 226 during pen shuttle motion. It should be noted that pen shuttles 70 through 76 and pen capping doors 219 through 225 respectively are operative in the same manner as pen shuttle 77 and door 226 and therefore the descriptions accompanying FIGS. 4, 5 and 6 are equally applicable to the remaining pen shuttles and pen capping doors.

Accordingly, FIG. 4 sets forth pen shuttle 77 in its raised position. Pen shuttle guide 50 defines a top 182 having an upwardly extending channel 183, a base 180 having a downwardly extending channel 181, and a pen channel 127, the structure of which is set forth above. Pen shuttle 77 supports pen 67 in a vertical position and defines a pair of inwardly extending generally cylindrical bosses 198 and 199 and a plurality of ball bearings 202, 203, 204 and 205 as well as an additional similar plurality of the ball bearings (not seen) on the other side of rib 109. The function of ball bearings associated with rib 109 of pen shuttle 77 is to provide a suitable rolling bearing for sliding contact with angled surfaces 144 and 145 of pen shuttle channel 127. Bosses 198 and 199 are received within pen shuttle back 197 and secured thereto by a pair of threaded fasteners 200 and 201. Pen shuttle back 197 defines an aperture 157 within which gear rack 117 is supported. The latter defines a generally tapered surface 118. A generally flat edge 185 forms the bottom surface of aperture 157. Pen shuttle back 197 further defines a generally conical, downwardly extending spring guide 167. Base 180 further defines a recess 146. A coiled spring 177 is compressively supported at one end within recess 146 and at the other end by its encircling of spring guide 167. Actuator beam 13 extends through aperture 184 in rotary drive housing 100 and is engaged by bearings 105 through 108 as described above. Drive housing 100 is supported by support flange 92 and gear 95 extends outwardly from drive housing 100. A flange support 237 is secured to the underside of base 180 by a fastener 267 and defines a downwardly extending flange 247. A pen cap 226 is pivotally supported beneath base 180 by a pin 209 which extends through flange 247 of flange support 237 as well as the corresponding flanges of the remaining flange supports (seen in FIGS. 7A through 7D). Pen cap 226 further defines a gear portion 257 concentrically positioned with respect to pin 209. Pen shuttle 77 defines a gear rack 277 which engages gear portion 257. As is better seen in FIGS. 7A through 7D, pen cap 226 defines a cavity 216 which receives pen tip 189 of pen 67.

In the position shown in FIG. 4, rotary drive 90 is in the rest position in which gear 95 extends into aperture 157 of pen shuttle back 197 and in which brake 102 is disengaged from actuator beam 13. In this position, and as described above, rotary drive 90 is freely carried by the motion of pen carriage 10 and pen 67 is removed from contact with the media. Spring 177 is captivated in compression by guide 167 and recess 146. As a result, the force of spring 177 urges pen shuttle 77 upwardly causing pen shuttle back 197 to abut the under surface of top 182 of pen shuttle guide 50. As actuator beam 13 is rotated in the clockwise direction causing drive housing 100 and gear 95 to be rotated in the clockwise direction, a downward force is applied to edge 185 of aperture 157 by edge 186 of gear 95. This force overcomes the force of spring 177 and moves pen shuttle back 197 and thereby pen shuttle 77 downwardly. With continued rotation of drive housing 100, gear 95 engages gear rack 117 and the downward motion of pen shuttle 77 continues.

In accordance with the present invention, pen capping door 226 is in its closed position when pen shuttle 77 is in the rest position shown in FIG. 4. The closure of pen capping door 226 against pen shuttle 77 seals pen tip 189 of pen 67 within pen cavity 216. As a result, pen tip 189 is protected from air flow passing across the pen carriage structure during carriage motion. As mentioned, pen capping doors 219 through 225 provide similar protection for pens 60 through 66 respectively.

FIG. 5 is identical to FIG. 4 with the exception that pen 67 has been moved to the recording position in which drive housing 100 is rotated in the clockwise direction causing gear 95 and rack 117 to cooperate to drive pen shuttle 77 downward until pen 67 contacts the media. As pen shuttle 77 is moved downwardly, spring 177 is compressed within recess 146 in base 180 and is captivated by the extension of spring guide 167 into recess 146. It should be noted that in the position shown in FIG. 5, brake 102 is out of contact with actuator beam 13 and rotary drive 90 is released from any engagement with actuator beam 13. This permits the above-described motion of the combination of rotary drive 90 and pen carriage 10 as pen 67 is used to record upon the media. In addition, the movement of pen shuttle 77 to its downward position causes gear rack 277 to rotate gear portion 257, which in turn pivots pen capping door 226 to expose pen tip 189. It should be noted that, in the position shown in FIG. 5, pen capping door 226 is rotated past its lowest extension and is raised to a position clear of pen tip 189 and media 80. Thus pen capping door 226 does not contact media 80 or interfere with the recording operation.

FIG. 6 sets forth the present invention system in which rotary drive 90 is completely disengaged from pen shuttle 77. In the position shown, actuator beam 13 and thereby drive housing 100 are shown rotated in the maximum counterclockwise direction bringing gear 95 into contact with gear stop 96. As can be seen, the absence of force applied to pen shuttle 77 by gear 95 results in permitting spring 177 to again return pen shuttle 77 to its maximum upward vertical travel. The upward motion of pen shuttle 77 rotates gear 257 and closes pen capping door 226. It should also be noted that gear 95, in its maximum counterclockwise position shown, no longer engages pen shuttle back 197. It should be further noted that brake 102 is in contact with actuator beam 13 which, as mentioned above, causes rotary drive 90 to remain in a fixed position upon actuator beam 13.

When viewed in sequence, FIGS. 4, 5 and 6 show the operation of the present invention automatic pen capping system throughout its entire range. In FIG. 4, with pen shuttle 77 raised, pen capping door 226 is tightly closed against pen shuttle 77 by the engagement of gear rack 277 with gear 257. The engagement between gear 257 and gear rack 277 is an interlocked direct engagement, which in accordance with an important aspect of the present invention provides a secure closing force between pen capping door 226 and pen shuttle 77 without the use of additional spring closure means. In accordance with an important aspect of the present invention, the upward bias force provided by spring 167 against pen shuttle 77 is coupled by gear rack 277 to gear 257. In other words, the force of spring 167 forces pen shuttle 77 upward and the engagement of gear rack 277 and gear 257 causes pen capping door 226 to be pivoted in the counterclockwise direction about pen 209 drawing it tightly against pen shuttle 77 and securely enclosing pen tip 189 of pen 67 within cavity 216.

In FIG. 5, pen shuttle 77 has been driven downward as described above by rotary drive 90 and the cooperation of gear rack 277 and gear 257 has rotated pen capping door 226 through an angular motion of approximately one hundred and fifty degrees as shown in FIG. 5. It should be noted that in accordance with an important aspect of the present invention, pen capping door 226 is rotated well past the angular rotation necessary to uncover pen tip 189. It should be further noted that the engagement of gear 257 and gear rack 277 continues notwithstanding the movement of pen shuttle 77 to its downward position of FIG. 5. Thus, the position of pen capping door 226 is securely maintained by the engagement of gear rack 277 and gear 257 without the use of additional components. In essence, the rotational force operative upon pen shuttle 77 by rotation of rotary drive 90 is also operative to maintain the position of pen capping door 226. With the return of pen shuttle 77 to its raised position as shown in FIGS. 4 and 6, the upward motion of pen shuttle 77 and therefore gear rack 277 rotates pen capping door 226 in the counterclockwise direction about pen 209 to again draw it into secure contact with pen shuttle 77 and seal pen tip 189.

FIGS. 7A, 7B, 7C and 7D set forth sequential perspective views of the operation of the present invention pen capping system. By way of example, the sequence of operation of pen shuttle 70 and pen capping door 219 is shown to illustrate the operation of the plurality of pen shuttles and pen capping doors. It should be understood, however, that the remaining combinations of pen shuttles and pen capping doors are operative in the same manner and may be understood by reference to the following discussions of pen shuttle 70, pen capping door 219 and their associated components.

Accordingly, FIG. 7A sets forth a bottom perspective view of pen carriage 10 supporting pen shuttles 70 through 77, which in turn support a corresponding plurality of recording pens 60 through 67 respectively. As described above, pen shuttles 70 through 77 are slideably supported within a plurality of channels (not shown) within pen shuttle guide 50 and are thus moveable from the positions shown in FIG. 7A to the extended positions shown sequentially in FIGS. 7B, 7C and 7D. As is also described above, pen shuttle guide 50 defines an extended base member 180, which in turn defines a lower surface 187 extending substantially across the length of pen shuttle guide 50. A plurality of flange supports 230 through 238 are of identical construction and define respective flange bases 290 through 298 which comprise generally rectangular planar members configured to be positioned upon surface 187 of base 180 in a linear array generally corresponding to the array of pen shuttles 70 through 77 respectively. Flange bases 290 through 298 each define a center aperture (not seen) which receives a respective one of threaded fasteners 260 through 268. In accordance with the invention, base 180 defines a plurality of threaded apertures (not shown) which extend inwardly from surface 187 and which receive fasteners 260 through 268 in a threaded engagement whereby flange bases 290 through 298 are secured to surface 187 of base 180 in the linear array shown in FIG. 7A.

Flange support 230 further defines a generally planar flange 240 which extends upwardly from flange base 290 and is supported above surface 187 of base 180 and is generally orthogonal thereto. Flange supports 231 through 238 define a corresponding plurality of upwardly extending flanges 241 through 248. The linear array of flange supports 230 through 238 are secured to surface 187 of base 180 such that flanges 240 through 248 are supported in a parallel linear array aligned with the positions of pen shuttles 70 through 77. As will be apparent from FIG. 7A, flange support 230 is positioned near the outer side of pen shuttle 70 and flange support 238 is positioned near the outer side of pen shuttle 77. The remaining flange supports 231 through 237 are positioned within the array such that flanges 241 through 247 are aligned with the respective spacings between pen shuttles 70 through 77 respectively. For example, flange 241 is positioned between pen shuttles 70 and 71 and flange 242 is positioned between pen shuttles 71 and 72. In further accordance with the present invention, flange 240 defines an aperture 249 extending through its approximate center. As mentioned, flanges 241 through 248 are identical in construction to flange 240; and while not seen in FIG. 7A, flanges 241 through 248 define a corresponding plurality of apertures. In the linear array of flange supports 230 through 238 and in accordance with an important aspect of the present invention, the apertures within flanges 240 through 248 are carefully aligned along a common center axis.

A plurality of pen capping doors 219 through 226 having identical structures are positioned in alignment with pen shuttles 70 through 77 respectively. Pen capping door 219 defines a generally planar portion 218 which in turn defines a sealing surface 214 (better seen in FIG. 7B). Pen capping door 219 further includes a gear 250 which in turn defines a plurality of outwardly extending gear teeth 258. A generally cylindrical spacer 280 extends outwardly from pen capping door 219. As is better seen in FIGS. 7C and 7D, planar portion 218 of pen capping door 219 defines an internal cavity 217 extending inwardly from surface 214. Pen capping door 219 further defines an internal passage 300 extending through gear 250 and spacer 280. Correspondingly, pen capping doors 220 through 226 define gear members 251 through 257, a plurality of spacers 281 through 287, and center passages 301 through 307 respectively.

Pen capping door 219 is positioned between flanges 240 and 241 such that gear 250 abuts flange 240 and spacer 280 abuts flange 241. Accordingly, the relative positions of flanges 240 and 241 and the configurations of gear 250 and spacer 280 are selected such that flanges 240 and 241 position pen capping door 219 with respect to surface 78 of pen shuttle 70 in which pen tip 179 of pen 60 is received within cavity 217 (the latter better seen in FIG. 7C). Correspondingly, flanges 241 through 248 are spaced with respect to pen shuttles 71 through 77 respectively to properly position pen capping doors 220 through 226 in a similar relationship to pen shuttles 71 through 77 respectively. When so positioned, center passages 300 through 308 of pen capping doors 219 through 226 are centered on the common axis of the above-mentioned apertures in flanges 240 through 248. This alignment permits an elongated cylindrical pin 209 to be passed through the apertures in flanges 240 through 248 and center passages 300 through 308 and provide a pivotal support for pen capping doors 219 through 226. A pair of conventional clip fasteners 227 and 228 are secured to the ends of pin 209 to maintain its position within the pen capping door array. As mentioned above and in accordance with an important aspect of the present invention, pen shuttles 70 through 77 define respective gear racks 270 through 277 which engage gears 250 through 257. In the closed positioned shown in FIG. 7A and as described above in connection with FIG. 4, the positioning force operative upon pen shuttles 70 through 77 which is provided by springs 170 through 177 (seen in FIG. 3) also provides the required force to maintain the sealing contact between pen capping doors 219 through 226 and pen shuttles 70 through 77.

FIG. 7B sets forth a perspective view of a portion of the linear array of pen shuttles and pen capping mechanisms shown in FIG. 7A. As mentioned above, the operation of pen shuttle 70 and pen capping door 219 are shown, for purposes of illustration, sequentially in FIGS. 7B through 7D. It should be understood that the functions of the remaining pen shuttles and pen capping doors are identical to pen shuttle 70 and pen capping door 219 and may be understood by reference to the following discussions.

Accordingly, pen shuttle 70 defines a flat surface 78 which in turn defines an aperture 79. Pen shuttle 70 further defines a cylindrical internal passage 82 which receives and supports pen 60 such that pen tip 179 extends through aperture 79 in surface 78. Pen shuttle guide 70 further defines a gear rack 270. As described above, flange supports 230 and 231 define respective flanges 240 and 241 which are positioned on either side of pen shuttle 70 and are maintained against surface 187 by a pair of fasteners 261 and 262 respectively. As is also described above, pen capping door 219 defines a planar portion 218 which in turn defines a planar surface 214. Pen capping door 219 further defines a gear portion 250 having a plurality of gear teeth 258 and a spacer 280. Pen capping door 219 is positioned between flanges 240 and 241 and is pivotally supported therebetween by pin 209 as described above. As is also mentioned above, gear teeth 258 engage gear rack 270 of pen shuttle 70. FIG. 7B shows pen shuttle 70 moved downwardly from the position shown in FIG. 7A by an initial increment. Accordingly, the cooperation of gear teeth 258 of gear 250 and gear rack 270 has rotated pen capping door 219 about pin 209 through an initial increment. As mentioned above, the engagement of gear teeth 258 with gear rack 270 is a direct continuous engagement such that the angular position of pen capping door 219 is directly related to the linear position of pen shuttle 70 in its movement within the pen shuttle guide.

FIG. 7C sets forth the respective positions of pen shuttle 70 and pen capping door 219 resulting from continued downward motion of pen shuttle 70 beyond the position shown in FIG. 7B. As can be seen, the additional motion of pen shuttle 70 results in further rotation of pen capping door 219 and further exposure of pen tip 179. Once again, it should be noted that the engagement of gear teeth 258 with gear rack 270 causes the angular position of pen capping door 219 to be directly related to the linear position of pen shuttle 70. It should be further noted in examination of FIG. 7C that the spacing between flanges 240 and 241 is selected to provide clearance for the passage of the lower portion of pen shuttle 70 therebetween.

FIG. 7D shown pen shuttle 70 in its lowered position corresponding to the recording position in which pen tip 179 is brought into contact with the recording media. It should be noted that the direct gear engagement between gear teeth 258 and gear rack 270 maintains the angular position of pen capping door 219 without additional positioning means. It should also be noted that the configuration of gear 250 is selected to assure that pen capping door 219 is rotated well past the downward position shown in FIG. 7C when pen shuttle 70 is lowered to record upon the media. The structure and spacing of flange supports 230 and 231 and flanges 240 and 241 permits this overcenter rotation of pen capping door 219.

The relative motions of pen shuttle 70 and pen capping door 219 which occur as pen shuttle 70 is raised from its maximum downward position shown in FIG. 7D to its raised or rest position shown in FIG. 7A are understood by viewing FIGS. 7D, 7C, 7B and 7A in reverse sequence. As pen shuttle 70 is raised from its lowered position in FIG. 7D, the linear motion of gear rack 270 rotates gear 250 which in turn pivots pen capping door 219 about pin 209 until closure is complete and the positions of pen shuttle 70 and pen capping door 219 return to those shown in FIG. 7A.

What has been shown is a lightweight, low cost, effective and mechanically simple automatic pen capping system for graphic recorders. The systems shown provides improved multi-pen graphic recording in which the degrading effect of pen drying due to carriage motion is avoided. No additional powered elements are required by the system while maintaining direct positive sealing and enclosure of the recording pen tips in the raised or non-recording positions.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. In a graphic recorder having a moveable pen carriage, supporting thereon a plurality of moveable pen shuttles and a corresponding plurality of recording pens each having an extending pen tip, and means moving a selected one of said plurality of pens into a write position by moving its associated pen shuttle, automatic pen capping means comprising:
   a plurality of gear racks each supported upon a respective one of said pen shuttles;
   a plurality of pen capping doors each configured to enclose a respective one of said extending pen tips of said plurality of recording pens;
   support means pivotally supporting said plurality of pen capping doors such that each pen capping door is pivotable between a closed position enclosing its associated pen tip and an open position exposing its associated pen tip; and
   a plurality of gear means each coupled to a respective one of said pen capping doors and engaging a respective one of said plurality of gear racks,
   each of said gear means and the respective one of said plurality of gear racks associated therewith cooperating during motion of their respective pen shuttles to pivot said pen capping door to enclose or expose its associated pen tip as a function of pen shuttle position.

2. Automatic pen capping means as set forth in claim 1 wherein said plurality of pen shuttles are supported in a linear array and are vertically moveable and wherein each of said pen shuttles defines a pen surface having an aperture through which its associated extending pen tip protrudes and wherein each of said pen capping doors within said plurality of pen capping doors defines:
   a sealing surface having a cavity recessed therefrom;
   said sealing surface overlying said pen surface in said closed position such that its associated extending pen tip is received within said recessed cavity.

3. Automatic pen capping means as set forth in claim 2 wherein said pen capping doors each define a door passage and wherein said support means include:
   a plurality of support flanges each defining a flange aperture therethrough;
   attachment means coupling said plurality of support flanges to said pen carriage such that said flange apertures are aligned on a common axis; and
   an elongated pin extending through said flange apertures and said door passages to pivotally support said pen capping doors in a linear array upon said pen carriage.

4. Automatic pen capping means as set forth in claim 3 wherein said support means each include a flange support base supporting said support flanges in a linear array such that said pen capping doors are interleaved within the linear array of support flanges.

5. Automatic pen capping means as set forth in claim 4 wherein said pen shuttles each define a rack surface and wherein said gear racks each include a first plurality of gear teeth defined by said rack surfaces in a linear arrangement along a gear path.

6. Automatic pen capping means as set forth in claim 5 wherein each of said gear means include a circular gear portion having a second plurality of gear teeth extending outwardly therefrom and engaging a respective first plurality of gear teeth, each of said circular gear portions being aligned with a respective one of said gear paths such that motion of said pen shuttles causes said first plurality of gear teeth to rotate said circular gear portions.

7. For use in a graphic recorder having a pen carriage supporting a plurality of pen shuttles each supporting a recording pen having a pen point, said pen shuttles being moveable between raised and lowered positions, automatic pen capping means comprising:
   a plurality of pen capping doors, each defining a pen recess;
   support means pivotally supporting each of said pen capping doors proximate to a respective one of said pen shuttles;
   gear means coupling each of said pen capping doors to the proximate one of said pen shuttles causing rotation of said pen capping doors to a closed position in which the pen point of the pen within its proximate pen shuttle is received within its pen recess when said proximate pen shuttle is raised and to an open position in which the pen point of the pen within its proximate pen shuttle is exposed when said proximate pen shuttle is moved to its lowered position.

8. Automatic pen capping means as set forth in claim 7 wherein each of said pen shuttles defines a sealing surface surrounding a portion of said pen points and wherein each of said pen capping doors defines a sealing surface surrounding said pen recess, said sealing surfaces of said pen shuttles and said pen capping doors being configured to seal said pen points within said pen recesses in said closed position.

9. Automatic pen capping means as set forth in claim 8 wherein said pen shuttles are arranged upon said pen carriage in a linear array and wherein said pen capping doors are supported in a corresponding linear array.

10. Automatic pen capping means as set forth in claim 9 wherein said support means include:
    a plurality of support flanges extending from said pen carriage each defining a pin aperture therethrough;
    a plurality of pin passages defined in each of said pen capping doors; and
    a cylindrical pin extending through said pluralities of pin apertures and pin passages.

11. Automatic pen capping means as set forth in claim 10 wherein each of said support flanges is adjustably positionable upon said pen carriage.

12. Automatic pen capping means as set forth in claim 11 wherein said support flanges are interleaved with said pen capping doors in said linear array such that the interior ones of said support flanges support both adjacent pen capping doors.

* * * * *